United States Patent
Chen

(10) Patent No.: US 9,959,797 B2
(45) Date of Patent: May 1, 2018

(54) ROUTE PROTECTION CIRCUIT AND LIQUID CRYSTAL DISPLAY

(71) Applicant: Shenzhen China Star Optoelectronics Technology Co., Ltd., Shenzhen, Guangdong (CN)

(72) Inventor: Xinhong Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 121 days.

(21) Appl. No.: 14/908,113

(22) PCT Filed: Nov. 26, 2015

(86) PCT No.: PCT/CN2015/095620
§ 371 (c)(1),
(2) Date: Jan. 27, 2016

(87) PCT Pub. No.: WO2017/063251
PCT Pub. Date: Apr. 20, 2017

(65) Prior Publication Data
US 2017/0263166 A1    Sep. 14, 2017

(30) Foreign Application Priority Data
Oct. 13, 2015   (CN) .......................... 2015 1 0670979

(51) Int. Cl.
*G09G 3/00* (2006.01)
*G09G 3/36* (2006.01)
(Continued)

(52) U.S. Cl.
CPC .......... *G09G 3/006* (2013.01); *G02F 1/1309* (2013.01); *G09G 3/3648* (2013.01);
(Continued)

(58) Field of Classification Search
CPC .... G09G 3/006; G09G 3/3648; G02F 1/1309; H02H 1/0007; H02H 3/025; H02H 3/16
See application file for complete search history.

(56) References Cited

U.S. PATENT DOCUMENTS 5,565,687 A * 10/1996 Berrill .................... G01D 5/145
                                                                250/577
7,408,755 B1 * 8/2008 Ye .......................... H02H 3/025
                                                                361/93.1
(Continued)

FOREIGN PATENT DOCUMENTS

CN    101763808 A    6/2010
CN    103260314 A    8/2013
CN    104700811 A    6/2015

*Primary Examiner* — Sejoon Ahn
(74) *Attorney, Agent, or Firm* — Andrew C. Cheng

(57) ABSTRACT

The circuit of the present invention comprises a detection module and a feedback module, wherein an output end of a power supply management module is coupled to one end of a voltage level shift module, and the other end of the voltage level shift module is coupled to a first end of the detection module, and a second end of the detection module is coupled to a WOA route module or a GOA route module, and a third end of the detection is coupled to one end of the feedback module, and the other end of the feedback module is coupled to an enable end of the power supply management module, and the detection module detects whether the WOA route module or the GOA route module is short, and feeds back a short signal; the feedback module receives the short signal, and sends a disable signal to the enable end.

6 Claims, 2 Drawing Sheets

(51) Int. Cl.
  *G02F 1/13* (2006.01)
  *H02H 1/00* (2006.01)
  *H02H 3/02* (2006.01)
  *H02H 3/16* (2006.01)

(52) U.S. Cl.
  CPC .......... *H02H 1/0007* (2013.01); *H02H 3/025* (2013.01); *H02H 3/16* (2013.01); *G09G 2300/0408* (2013.01); *G09G 2310/0289* (2013.01); *G09G 2330/12* (2013.01)

(56) References Cited

U.S. PATENT DOCUMENTS

| | | | | |
|---|---|---|---|---|
| 2005/0093488 A1* | 5/2005 | Hung | ................ | H05B 33/0842 315/307 |
| 2009/0097180 A1* | 4/2009 | Feng | ................... | G09G 3/3406 361/91.1 |
| 2009/0195190 A1* | 8/2009 | Fong | ................... | H05B 33/0815 315/297 |
| 2009/0200871 A1* | 8/2009 | Luck | ................... | G03G 15/5004 307/80 |
| 2010/0259956 A1* | 10/2010 | Sadwick | ............ | H05B 33/0815 363/50 |
| 2011/0080384 A1 | 4/2011 | Liu et al. | | |
| 2012/0032610 A1* | 2/2012 | Kang | ................... | H02M 3/156 315/297 |
| 2012/0127213 A1* | 5/2012 | Park | ....................... | G09G 3/006 345/690 |
| 2014/0132182 A1* | 5/2014 | Angeles | ................. | G05F 1/10 315/294 |
| 2014/0363169 A1* | 12/2014 | Conger | ................ | H04B 10/693 398/115 |
| 2015/0332651 A1* | 11/2015 | Miyazawa | ........... | G09G 3/3614 345/211 |
| 2017/0263166 A1* | 9/2017 | Chen | ..................... | G09G 3/006 |
| 2017/0271866 A1* | 9/2017 | Park | ...................... | G09G 3/006 |

* cited by examiner

ROUTE PROTECTION CIRCUIT AND LIQUID CRYSTAL DISPLAY

CROSS REFERENCE

This application claims the priority of Chinese Patent Application No. 201510670979.8, entitled "Route protection circuit and liquid crystal display", filed on Oct. 13, 2015, the disclosure of which is incorporated herein by reference in its entirety.

FIELD OF THE INVENTION

The present invention relates to a display skill field, and more particularly to a route protection circuit and a liquid crystal display.

BACKGROUND OF THE INVENTION

As shown in FIG. 1, the driving circuit of the liquid crystal display generally comprises a power IC 110, a voltage level shift circuit 120, a wire on array route circuit 130, a gate on array route circuit 140 and a liquid crystal panel 150. The power IC 110 is coupled to one end of the voltage level shift circuit 120, and the other end of the voltage level shift circuit 120 is coupled to one end of the wire on array route circuit 130, and the other end of the wire on array route circuit 130 is coupled to one end of the gate on array route circuit 140 and the other end of the gate on array route circuit 140 is coupled to the liquid crystal panel 150. The power IC 110 will cut off the power for protection as the current exceeds the threshold value. However, in case that the wire on array route circuit 130, the gate on array route circuit 140 are short, and if the current does not exceed the threshold value, the power IC 110 will not cut off the power for protection. Consequently, the liquid crystal panel 150 will be burned and damaged.

SUMMARY OF THE INVENTION

The technical issue that the embodiment of the present invention solves is to provide a route protection circuit and a liquid crystal display for providing protection as the route is short.

The present invention provides a route protection circuit, comprising a detection circuit and a feedback circuit, wherein an output end of a power supply management circuit is coupled to one end of a voltage level shift circuit, and the other end of the voltage level shift circuit is coupled to a first end of the detection circuit, and a second end of the detection circuit is coupled to a wire on array route circuit or a gate on array route circuit, and a third end of the detection is coupled to one end of the feedback circuit, and the other end of the feedback circuit is coupled to an enable end of the power supply management circuit, and the detection circuit comprises an optocoupler and a current-limiting resistance, wherein a first input end of the optocoupler is employed to couple to another end of the voltage level shift circuit, and a second input end of the optocoupler is employed to couple to the wire on array route circuit or the gate on array route circuit, and a first output end of the optocoupler is coupled to one end of the current-limiting resistance, and the other end of the current-limiting resistance is employed to couple to a power supply, and a second output end of the optocoupler is employed to be grounded; the feedback circuit comprises a voltage comparator and a switch, and a negative end of the voltage comparator is coupled to a common end of the optocoupler and the current-limiting resistance, and a positive end of the voltage comparator is employed to input a reference voltage, and an output end of the voltage comparator is coupled to a first end of the switch, and a second end of the switch is coupled to the enable end of the power supply management circuit, and a third end of the switch is grounded.

Selectably, the resistance value of the current-limiting resistance is 10 kilohm.

Selectably, the switch is a P channel enhancement mode triode.

The present invention provides a route protection circuit, comprising a detection circuit and a feedback circuit, wherein an output end of a power supply management is coupled to one end of a voltage level shift circuit, and the other end of the voltage level shift circuit is coupled to a first end of the detection circuit, and a second end of the detection circuit is coupled to a wire on array route circuit or a gate on array route circuit, and a third end of the detection is coupled to one end of the feedback circuit, and the other end of the feedback circuit is coupled to an enable end of the power supply management circuit, and the detection circuit is employed to detect whether the wire on array route circuit or the gate on array route circuit is short, and feeds back a short signal to the feedback circuit as the wire on array route circuit or the gate on array route circuit is short; the feedback circuit is employed to receive the short signal fed back by the detection circuit, and sends a disable signal to the enable end of the power supply management circuit to make the power supply management circuit be disabled.

Selectably, the detection circuit comprises an optocoupler and a current-limiting resistance, wherein a first input end of the optocoupler is employed to couple to another end of the voltage level shift circuit, and a second input end of the optocoupler is employed to couple to the wire on array route circuit or the gate on array route circuit, and a first output end of the optocoupler is coupled to one end of the current-limiting resistance, and the other end of the current-limiting resistance is employed to couple to a power supply, and a second output end of the optocoupler is employed to be grounded.

Selectably, the feedback circuit comprises a voltage comparator and a switch, and a negative end of the voltage comparator is coupled to a common end of the optocoupler and the current-limiting resistance, and a positive end of the voltage comparator is employed to input a reference voltage, and an output end of the voltage comparator is coupled to a first end of the switch, and a second end of the switch is coupled to the enable end of the power supply management circuit, and a third end of the switch is grounded.

Selectably, the resistance value of the current-limiting resistance is 10 kilohm.

Selectably, the switch is a P channel enhancement mode triode.

The present invention further provides a liquid crystal display, comprising a liquid crystal display panel and a bottom plate, and the liquid crystal display panel comprises a route protection circuit, and the route protection circuit comprises a detection circuit and a feedback circuit, wherein an output end of a power supply management circuit is coupled to one end of a voltage level shift circuit, and the other end of the voltage level shift circuit is coupled to a first end of the detection circuit, and a second end of the detection circuit is coupled to a wire on array route circuit or a gate on array route circuit, and a third end of the detection is coupled to one end of the feedback circuit, and the other end of the feedback circuit is coupled to an enable end of the power supply management circuit, and the detection circuit is employed to detect whether the wire on array route circuit or the gate on array route circuit is short, and feeds back a short signal to the feedback circuit as the wire on array route circuit or the gate on array route circuit is short; the feedback circuit is employed to receive the short signal fed back by the detection circuit, and sends a disable signal to the enable end of the power supply management circuit to make the power supply management circuit be disabled.

Selectably, the detection circuit comprises an optocoupler and a current-limiting resistance, wherein a first input end of the optocoupler is employed to couple to another end of the voltage level shift circuit, and a second input end of the optocoupler is employed to couple to the wire on array route circuit or the gate on array route circuit, and a first output end of the optocoupler is coupled to one end of the current-limiting resistance, and the other end of the current-limiting resistance is employed to couple to a power supply, and a second output end of the optocoupler is employed to be grounded.

Selectably, the feedback circuit comprises a voltage comparator and a switch, and a negative end of the voltage comparator is coupled to a common end of the optocoupler and the current-limiting resistance, and a positive end of the voltage comparator is employed to input a reference voltage, and an output end of the voltage comparator is coupled to a first end of the switch, and a second end of the switch is coupled to the enable end of the power supply management circuit, and a third end of the switch is grounded.

Selectably, the resistance value of the current-limiting resistance is 10 kilohm.

Selectably, the switch is a P channel enhancement mode triode.

By implementing the embodiment of the present invention, the detection circuit sends the short signal to the feedback circuit as the wire on array route circuit or the gate on array route circuit is short. Thus, the feedback circuit sends the disable signal to the enable end of the power supply management circuit as it receives the short signal to make the power supply management circuit be disabled and stops providing power. Accordingly, it can prevent the wire on array route circuit or the gate on array route circuit from being burned and damaged due to the short circuit.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Figure 1:
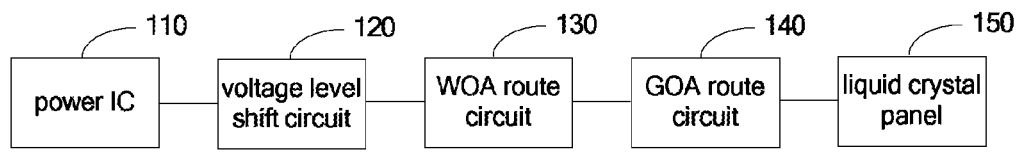
FIG. 1 is a circuit diagram of a driver of a liquid crystal display according to prior art.
Figure 2:
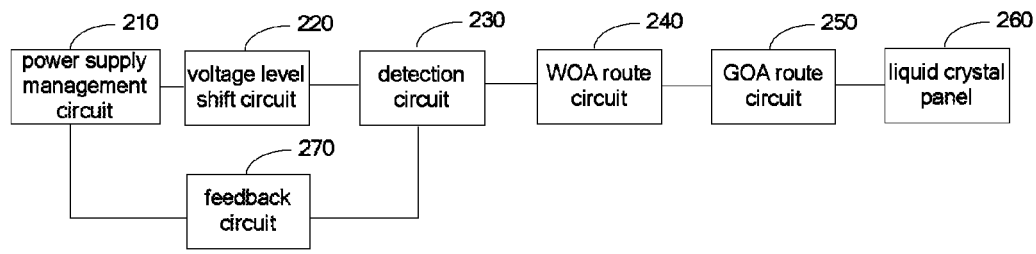
FIG. 2 is a circuit diagram of one route protection provided by the embodiment of the present invention.

Please refer to FIG. 2. FIG. 2 is a circuit diagram of one route protection provided by the embodiment of the present invention. The route protection circuit of this embodiment comprises: a detection circuit 230 and a feedback circuit 270, wherein an output end of a power supply management circuit 210 is coupled to one end of a voltage level shift circuit 220, and the other end of the voltage level shift circuit 220 is coupled to a first end of the detection circuit 230, and a second end of the detection circuit 230 is coupled to one end of a wire on array route circuit 240, and the other end of the wire on array route circuit 240 is coupled to one end of a gate on array route circuit 250, and the other end of the gate on array route circuit 250 is coupled to a liquid crystal panel 260, and a third end of the detection 230 is coupled to one end of the feedback circuit 270, and the other end of the feedback circuit 270 is coupled to an enable end of the power supply management circuit 210.

The power supply management circuit 210 generally is a power IC, such as chips of TNY274PN, TNY280PN. The power supply management circuit 210 converts the AC power supply into kinds of direct currents of 5V, 12V to be outputted to the voltage level shift circuit 220. The voltage shift circuit 220 changes the direct current outputted by the power supply management circuit 210 into the voltage matching with the voltage of the liquid crystal panel 260 to be outputted to the detection circuit 230.

As the wire on array route circuit 240 and the gate on array route circuit 250 are not short, the detection circuit 230 transmits the voltage outputted by the voltage shift circuit 220 to the wire on array route circuit 240, and the wire on array route circuit 240 transmits the voltage to the gate on array route circuit 250. Then, the gate on array route circuit 250 transmits the voltage to the liquid crystal panel 260 to drive the liquid crystal panel 260 for working. As the wire on array route circuit 240 or the gate on array route circuit 250 is short, the current in the circuit detected by the detection circuit 230 dramatically increases. Thus, the detection circuit 230 outputs a feedback short signal to the feedback circuit 270. The feedback circuit 270 receives the short signal fed back by the detection circuit 230, and sends a disable signal to the enable end of the power supply management circuit 210. The disable signal makes the power supply management circuit be disabled. Consequently, the power supply management circuit 210, and the liquid crystal panel 260 will not be burned and damaged.

Figure 3:
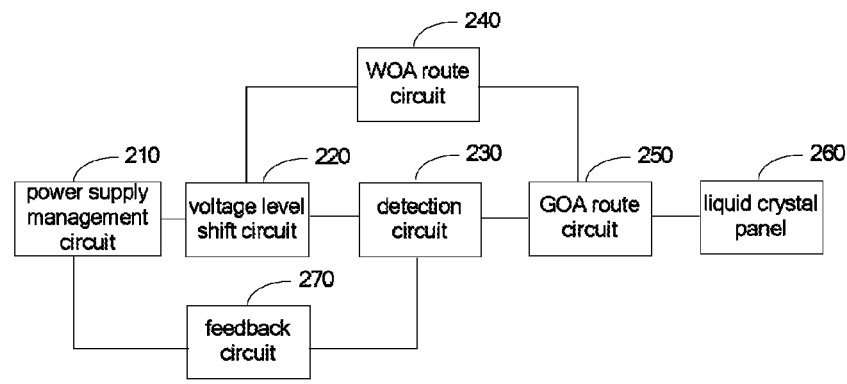
FIG. 3 is a circuit diagram of another route protection provided by the embodiment of the present invention.

Please refer to FIG. 3. FIG. 3 is a circuit diagram of another route protection provided by the embodiment of the present invention. The route protection circuit of this embodiment comprises: a detection circuit 230 and a feedback circuit 270, wherein an output end of a power supply management circuit 210 is coupled to a first end of a voltage level shift circuit 220, and a second end of the voltage level shift circuit 220 is coupled to one end of a wire on array route circuit 240, and the other end of the wire on array route circuit 240 is coupled to a first end of a gate on array route circuit 250, and a second end of the gate on array route circuit 250 is coupled to a liquid crystal panel 260, and a first end of the detection 230 is coupled to a third end of the voltage level shift circuit 220, and a second end of the detection 230 is coupled to the gate on array route circuit 250, and a third end of the detection circuit 230 is coupled to one end of the feedback circuit 270, and the other end of the feedback circuit 270 is coupled to an enable end of the power supply management circuit 210.

The power supply management circuit 210 generally is a power IC, such as chips of TNY274PN, TNY280PN. The power supply management circuit 210 converts the AC power supply into kinds of direct currents of 5V, 12V to be outputted to the voltage level shift circuit 220. The voltage shift circuit 220 changes the direct current outputted by the power supply management circuit 210 into the voltage matching with the voltage of the liquid crystal panel 260 to be respectively outputted to the wire on array route circuit 240 and the detection circuit 230. The wire on array route circuit 240 and the detection circuit 230 transmits the voltages to the gate on array route circuit 250.

As the gate on array route circuit 250 is not short, the gate on array route circuit 250 transmits the voltage to the liquid crystal panel 260 to drive the liquid crystal panel 260 for working. As the gate on array route circuit 250 is short, the current in the circuit detected by the detection circuit 230 dramatically increases. Thus, the detection circuit 230 outputs a feedback short signal to the feedback circuit 270. The feedback circuit 270 receives the short signal fed back by the detection circuit 230, and sends a disable signal to the enable end of the power supply management circuit 210. The disable signal makes the power supply management circuit be disabled. Consequently, the power supply management circuit 210, and the liquid crystal panel 260 will not be burned and damaged.

Figure 4:
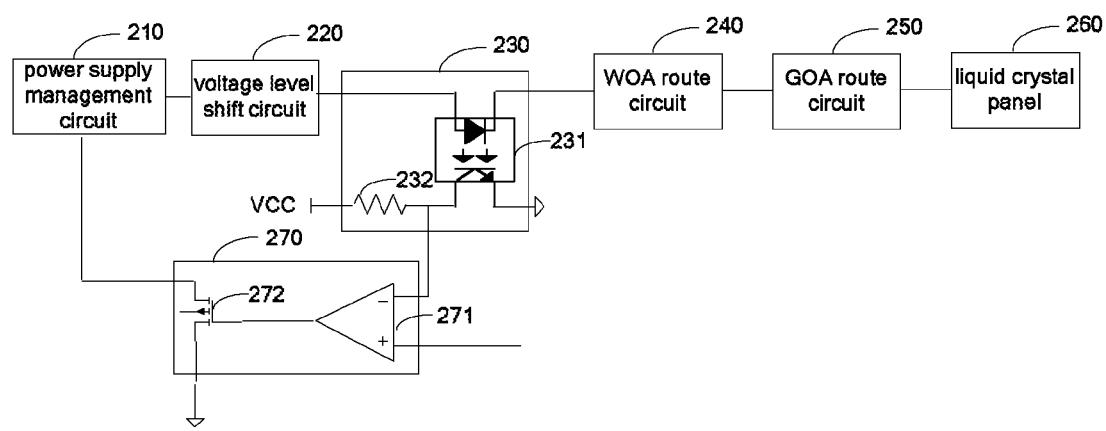
FIG. 4 is a circuit diagram of one another route protection provided by the embodiment of the present invention.

Please refer to FIG. 4. FIG. 4 is a circuit diagram of one another route protection provided by the embodiment of the present invention. The route protection circuit of this embodiment comprises: a detection circuit 230 and a feedback circuit 270, wherein the detection circuit 230 comprises an optocoupler 231 and a current-limiting resistance 232. The resistance value of the current-limiting resistance 232 is 10 kilohm. The feedback circuit 270 comprises a voltage comparator 271 and a switch 272. The switch 272 is a P channel enhancement mode triode.

An output end of a power supply management circuit 210 is coupled to one end of a voltage level shift circuit 220. The other end of the voltage level shift circuit 220 is coupled to a first input end of the optocoupler 231, and a second input end of the optocoupler 231 is coupled to one end of a wire on array route circuit 240, and the other end of the wire on array route circuit 240 is coupled to one end of a gate on array route circuit 250, and the other end of the gate on array route circuit 250 is coupled to a liquid crystal panel, and a first output end of the optocoupler 231 is coupled to one end of the current-limiting resistance 232, and the other end of the current-limiting resistance 232 is employed to be coupled to the power supply VCC, and a second output end of the optocoupler 231 is grounded. A negative end of the voltage comparator 271 is coupled to a common end of the optocoupler 231 and the current-limiting resistance 232, and a positive end of the voltage comparator 271 is employed to input a reference voltage, and an output end of the voltage comparator 271 is coupled to a first end of the switch 272, and a second end of the switch 272 is coupled to the enable end of the power supply management circuit 210, and a third end of the switch 272 is grounded.

The power supply management circuit 210 generally is a power IC, such as chips of TNY274PN, TNY280PN. The power supply management circuit 210 converts the AC power supply into kinds of direct currents of 5V, 12V to be outputted to the voltage level shift circuit 220. The voltage shift circuit 220 changes the direct current outputted by the power supply management circuit 210 into the voltage matching with the voltage of the liquid crystal panel 260 to be outputted to the detection circuit 230.

As the wire on array route circuit 240 and the gate on array route circuit 250 are not short, the voltage outputted by the voltage shift circuit 220 is transmitted to the wire on array route circuit 240 through the light emitting diode in the optocoupler 231, and the wire on array route circuit 240 transmits the voltage to the gate on array route circuit 250. Then, the gate on array route circuit 250 transmits the voltage to the liquid crystal panel 260 to drive the liquid crystal panel 260 for working. Because the wire on array route circuit 240 and the gate on array route circuit 250 are not short, the current of the light emitting diode in the optocoupler 231 is not large, and the light generated by the light emitting diode is not strong, and the photistor in the optocoupler 231 is off. The current generated by the power supply VCC flows through the current-limiting resistance 232 and is inputted to the negative end of the comparator 271. The voltage inputted to the negative end of the comparator 271 is larger than the reference voltage inputted to the positive end of the comparator. The output end of the comparator 271 outputs low voltage level to the first end of the switch 272. With the function of low voltage level, the switch 272 is off, and the power supply management circuit 210 normally works.

As the wire on array route circuit 240 or the gate on array route circuit 250 is short, the current of the light emitting diode in the optocoupler 231 dramatically increases. Thus, the light generated by the light emitting diode increases, and the photistor in the optocoupler 231 is on, and low voltage level is inputted to the negative end of the feedback circuit 270 through the photistor. The voltage inputted to the negative end of the comparator 271 is smaller than the reference voltage inputted to the positive end of the comparator. The output end of the comparator 271 outputs high voltage level to the first end of the switch 272. With the function of high voltage level, the switch 272 is on, outputting low voltage level to the enable end of the power supply management circuit 210 makes the power supply management circuit be disabled. Consequently, the power supply management circuit 210, and the liquid crystal panel 260 will not be burned and damaged.

By implementing the embodiment of the present invention, the detection circuit sends the short signal to the feedback circuit as the wire on array route circuit or the gate on array route circuit is short. Thus, the feedback circuit sends the disable signal to the enable end of the power supply management circuit as it receives the short signal to make the power supply management circuit be disabled and stops providing power. Accordingly, it can prevent the wire on array route circuit or the gate on array route circuit from being burned and damaged due to the short circuit.

The present invention further provides a liquid crystal display, comprising a liquid crystal display panel and a bottom plate. The liquid crystal display panel comprises the route protection circuit shown in FIG. 2, FIG. 3, FIG. 4. The detail specification can be referred to FIG. 2 to FIG. 4 and related descriptions. The repeated description is omitted here.

It is understandable in practical to the person who is skilled in the art that all or portion of the processes in the method according to the aforesaid embodiment can be accomplished with the computer program to instruct the related hardwares. The program can be stored in a readable storage medium if the computer. As the program is executed, the processes of the embodiments in the aforesaid respective methods can be included. The storage medium can be a hard disk, an optical disc, a Read-Only Memory (ROM) or a Random Access Memory (RAM).

Above are embodiments of the present invention, which does not limit the scope of the present invention. Any modifications, equivalent replacements or improvements within the spirit and principles of the embodiment described above should be covered by the protected scope of the invention.

What is claimed is:

1. A route protection circuit comprising:
    a detection circuit and a feedback circuit, wherein an output end of a power supply management circuit is coupled to one end of a voltage level shift circuit, and another end of the voltage level shift circuit is coupled to a first end of the detection circuit, and a second end of the detection circuit is coupled to a wire on array route circuit or a gate on array route circuit, and a third end of the detection is coupled to one end of the feedback circuit, and the other end of the feedback circuit is coupled to an enable end of the power supply management circuit, and
    the detection circuit comprises an optocoupler and a current-limiting resistance, wherein a first input end of the optocoupler is employed to couple to another end of the voltage level shift circuit, and a second input end of the optocoupler is employed to couple to the wire on array route circuit or the gate on array route circuit, and a first output end of the optocoupler is coupled to one end of the current-limiting resistance, and the other end of the current-limiting resistance is employed to couple to a power supply, and a second output end of the optocoupler is employed to be grounded;
    the feedback circuit comprises a voltage comparator and a switch, and a negative end of the voltage comparator is coupled to a common end of the optocoupler and the current-limiting resistance, and a positive end of the voltage comparator is employed to input a reference voltage, and an output end of the voltage comparator is coupled to a first end of the switch, and a second end of the switch is coupled to the enable end of the power supply management circuit, and a third end of the switch is grounded,
    as the wire on array route circuit or the gate on array route circuit is short, the optocoupler in the detection circuit inputs a low voltage level to the negative end of the voltage comparator in the feedback circuit as a short signal fed back by the detection circuit, which is smaller than a reference voltage inputted to the positive end of the comparator and then, the output end of the comparator outputs a high voltage level to the first end of the switch to activate the switch to send a low voltage level as a disable signal to the enable end of the power supply management circuit to make the power supply management circuit be disabled to prevent the wire on array route circuit or the gate on array route circuit from damage due to being short.

2. The circuit according to claim 1, wherein the resistance value of the current-limiting resistance is 10 kilohm.

3. The circuit according to claim 1, wherein the switch is a P channel enhancement mode triode.

4. A liquid crystal display, comprising a liquid crystal display panel and a bottom plate, and the liquid crystal display panel comprises a route protection circuit, and the route protection circuit comprises a detection circuit and a feedback circuit, wherein an output end of a power supply management circuit is coupled to one end of a voltage level shift circuit, and another end of the voltage level shift circuit is coupled to a first end of the detection circuit, and a second end of the detection circuit is coupled to a wire on array route circuit or a gate on array route circuit, and a third end of the detection is coupled to one end of the feedback circuit, and the other end of the feedback circuit is coupled to an enable end of the power supply management circuit;
    wherein the detection circuit comprises an optocoupler and a current-limiting resistance, wherein a first input end of the optocoupler is employed to couple to another end of the voltage level shift circuit, and a second input end of the optocoupler is employed to couple to the wire on array route circuit or the gate on array route circuit, and a first output end of the optocoupler is coupled to one end of the current-limiting resistance, and the other end of the current-limiting resistance is employed to couple to a power supply, and a second output end of the optocoupler is employed to be grounded; wherein the feedback circuit comprises a voltage comparator and a switch, and a negative end of the voltage comparator is coupled to a common end of the optocoupler and the current-limiting resistance, and a positive end of the voltage comparator is employed to input a reference voltage, and an output end of the voltage comparator is coupled to a first end of the switch, and a second end of the switch is coupled to the enable end of the power supply management circuit, and a third end of the switch is grounded;
    the detection circuit is employed to detect whether the wire on array route circuit or the gate on array route circuit is short, and the optocoupler in the detection circuit feeds back a low voltage level to the negative end of the voltage comparator as a short signal, which is smaller than a reference voltage inputted to the positive end of the comparator as the wire on array route circuit or the gate on array route circuit is short; then, the output end of the comparator in the feedback circuit outputs a high voltage level to the first end of the switch to activate the switch to send a low voltage level as a disable signal to the enable end of the power supply management circuit to make the power supply management circuit be disabled to prevent the wire on array route circuit or the gate on array route circuit from damage due to being short.

5. The liquid crystal display according to claim 4, wherein the resistance value of the current-limiting resistance is 10 kilohm.

6. The liquid crystal display according to claim 4, wherein the switch is a P channel enhancement mode triode.

\* \* \* \* \*